(12) United States Patent
Tomita et al.

(10) Patent No.: US 7,031,260 B1
(45) Date of Patent: Apr. 18, 2006

(54) CENTRAL MANAGEMENT APPARATUS AND MANAGEMENT SYSTEM

(75) Inventors: Atsushi Tomita, Toyohashi (JP);
Masazumi Ito, Toyohashi (JP)

(73) Assignee: Minolta Co., LTD, Osaka (JP)

( * ) Notice: Subject to any disclaimer, the term of this patent is extended or adjusted under 35 U.S.C. 154(b) by 886 days.

(21) Appl. No.: 09/633,229

(22) Filed: Aug. 4, 2000

(30) Foreign Application Priority Data

Aug. 9, 1999 (JP) .................................. 11-225834

(51) Int. Cl.
*G01R 31/08* (2006.01)

(52) U.S. Cl. ........................... 370/242; 370/252; 399/8

(58) Field of Classification Search ........ 370/241–245, 370/252–253, 329; 714/1–25; 399/8
See application file for complete search history.

(56) References Cited

U.S. PATENT DOCUMENTS

| 4,583,834 A | 4/1986 | Seko et al. ................... 355/14 |
| 5,802,271 A * | 9/1998 | Hashimoto et al. | |
| 5,887,216 A * | 3/1999 | Motoyama ..................... 399/8 |
| 5,933,675 A * | 8/1999 | Sawada et al. ................. 399/8 |
| 6,567,381 B1 * | 5/2003 | Jeon et al. ................... 370/252 |
| 6,741,576 B1 * | 5/2004 | Alimi et al. ................ 370/329 |

FOREIGN PATENT DOCUMENTS

| JP | 3-048561 | * | 3/1991 |
| JP | 4-088358 | * | 3/1992 |
| JP | 6-131278 | * | 5/1994 |
| JP | 11-154004 | * | 6/1996 |
| JP | 11211230 | * | 8/1999 |

* cited by examiner

*Primary Examiner*—Phirin Sam
*Assistant Examiner*—Robert W. Wilson
(74) *Attorney, Agent, or Firm*—Morrison & Foerster LLP

(57) ABSTRACT

A central management apparatus determines whether or not data transmitted to the central management apparatus at the fixed time from a device management unit has arrived within the allowable time after the fixed time. When data have not arrived, it is determined that that device is a no reception device. When a plurality of devices are managed via connection to device management units using different communication methods, different allowable time are used for no reception determination in accordance with the communication method of the device management unit.

11 Claims, 18 Drawing Sheets

| b7 | b6 | b5 | b4 | b3 | b2 | b1 | b0 |

CENTRAL MANAGEMENT APPARATUS AND MANAGEMENT SYSTEM

This application is based on Patent Application No. 11-225834 filed in Japan, the content of which is hereby incorporated by reference.

BACKGROUND OF THE INVENTION

1. Field of the Invention

The present invention relates to a central management apparatus for managing devices (image forming apparatuses and the like) connected to device management units through data communication with the various management units.

2. Description of the Related Art

Management systems are known which batch manage at a center apparatus the devices (image forming apparatuses and the like) connected to each device management unit by a connecting device management unit for data collection and the like to an image forming apparatus and executing data communication between the central management apparatus and the plurality of device management units.

In this management system, time for communication between the device management units and the central management apparatus is allocated to each device management unit avoiding duplication so as to provide data communication between the central management apparatus and the plurality of device management units to avoid congestion of communication traffic. Furthermore, in this management system, the device management units are constructed so as to transmission the central management apparatus to communicate when trouble occurs in an image forming apparatus and not only to transmit collected data periodically to the central management apparatus. Furthermore, the central management device determines [no reception] when a device management unit has not sent data (normal data transmission other than a trouble data) at a set time after the allotted time has elapsed, deems some trouble to have occurred, and executes a trouble response.

Known communication means used by the management system include the method of sending/receiving data while apparatuses at both ends (device management unit and central management apparatus) maintain a communication line connection (telephone, facsimile and the like) (i.e., methods using a public telephone network), and the method wherein electronic mail (internet mail (packet data)) transmitted from one apparatus is received by the other apparatus through a plurality of computers.

When the central management device determines [no reception] when a device management unit has not sent data at a set time after the allotted by the management system time has elapsed, the [no reception] state is not determined immediately after the allotted time has elapsed, but rather the [no reception] state is determined when data transmission has not occurred after a certain allowed time has elapsed after the allotted time.

The previously mentioned method using a public telephone network and method using electronic mail are communication means, and both methods have differences as to the causes delaying data of the set time. That is, in the former method a cause may be that a connection cannot be made because another device is using the line, whereas in the latter method, in relation to reliable delivery of the data at the center after the connection is made, reception of the transmission may be delayed because one of the intervening computers goes down while the transmission is in transit even though transmission occurred within the fixed time.

Accordingly, when considering a management system comprising a central management apparatus connected to a plurality of device management units respectively provided with different communication means, there is the problem of setting the allowable time when determining [no reception]. That is, when the allowable time is set in consideration of the characteristics of the former communication means, there are many occurrences of [no reception] regardless of normal data transmission by device management units provided with the latter communication means, thereby producing needless counter measure response by the central management apparatus, and increasing the confusion arising from such needless response. On the other hand, when the allowable time is set in consideration of the characteristics of the latter communication means, there are frequent delays in determining [no reception] of device management units provided with the former communication means, and as a result there are many delays in suitable response by the central management apparatus.

SUMMARY OF THE INVENTION

An object of the present invention is to accurately detect fixed-time communication anomaly with various device management units even when the communication means used between the central management apparatus and the various device management units is a mixture of communication means of a plurality of different types in a system wherein a central management apparatus batch manages devices connected to various device management units by communication between the central management apparatus and the plurality of device management units at suitable times.

These objects are attained by a first aspect of the central management apparatus for managing devices connected to device management units by data communication with the device management units, the central management apparatus comprising: a memory for storing the fixed-time transmission time determined for each device; a setting means for setting an allowable time for each device or each device management unit connected to the devices based on the communication method of each device management unit; and a determination means for determining that a device that has not transmitted data until the allowable time has elapsed after the fixed time stored in memory is a non-communicating device.

A second aspect of the central management apparatus is a central management apparatus for managing devices connected to device management units by data communication with first and second device management units using different communication methods, the central management apparatus comprising: a memory for storing a first transmission time set for the first device management unit and a second transmission time set for the second device management unit; a first counting means for counting the elapsed time from the first transmission time when data have not been received from the first device management unit at the first transmission time; a second counting means for counting the elapsed time from the second transmission time when data have not been received from the second device management unit at the second transmission time; a threshold setting means for setting a first threshold value for the first device management unit and setting a second threshold value different from the first threshold value for the second device management unit; and a determining means for determining a no reception condition when the counted elapsed time by the first counting means exceeds the first threshold value or the counted elapsed time by the second counting means exceeds the second threshold value.

A third aspect of the device management system is a device management system including a central management apparatus, a first device management unit for data communication with the central management apparatus using a first communication method, and a second device management unit for data communication with the central management apparatus using a second communication method, the first device management unit comprising a first transmission means for transmitting data relating to a connected device to the central management apparatus at a first fixed time, the second device management unit comprising a second transmission means for transmitting data relating to a connected device to the central management apparatus at a second fixed time, and the central management apparatus comprising: a memory for storing a first transmission time set for the first device management unit and a second transmission time set for the second device management unit; a first counting means for counting the elapsed time from the first transmission time when data have not been received from the first device management unit at the first transmission time; a second counting means for counting the elapsed time from the second transmission time when data have not been received from the second device management unit at the second transmission time; a threshold setting means for setting a first threshold value for the first device management unit, and setting a second threshold value different from the first threshold value for the second device management unit; and a determining means for determining a no reception condition when the counted elapsed time by the first counting means exceeds the first threshold value or the counted elapsed time by the second counting means exceeds the second threshold value.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS (1) System Structure

Figure 1:
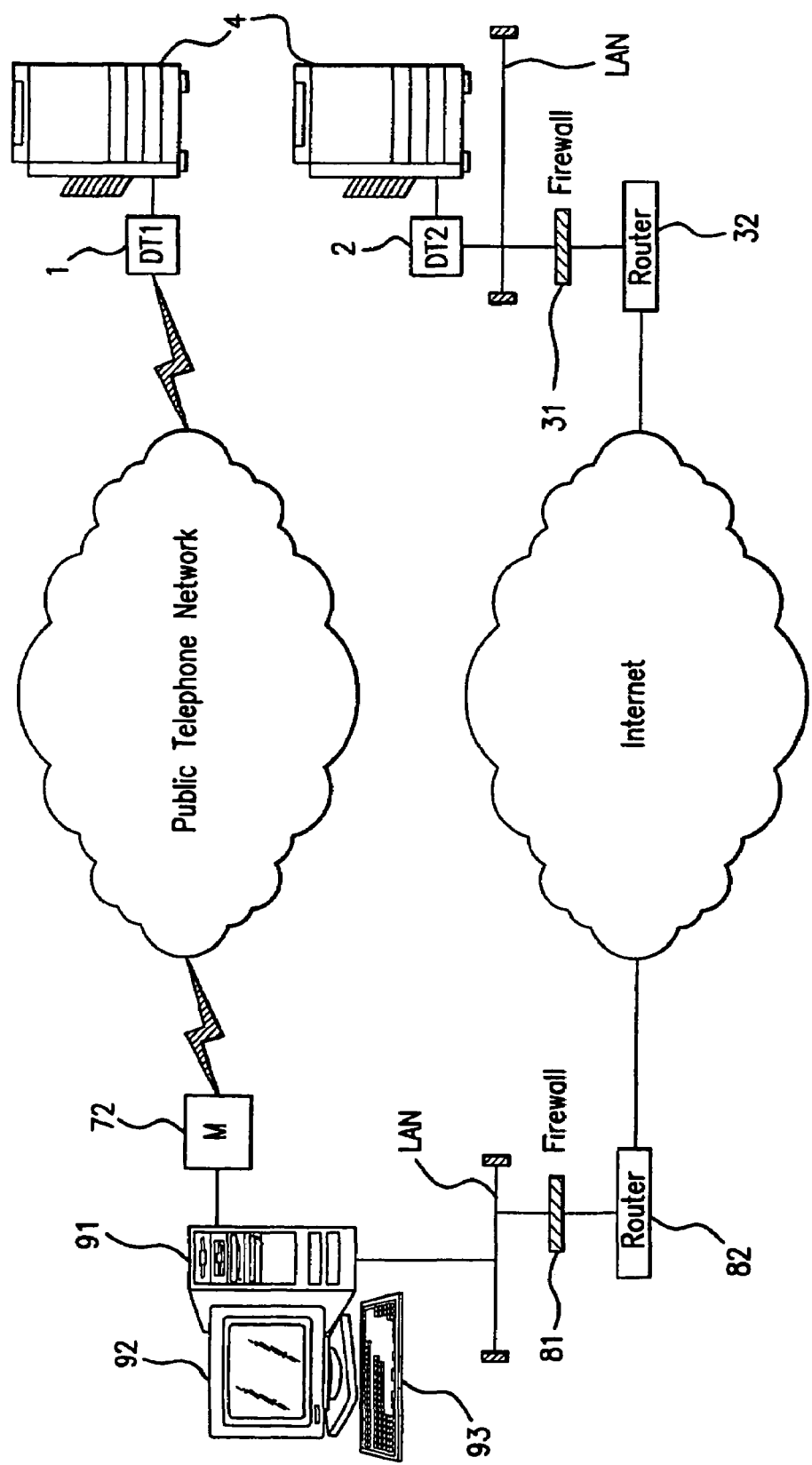
FIG. 1 shows the overall management system.

FIG. 1 shows a management system wherein a central management apparatus (hereinafter: central management unit) and a plurality of copier management units DT (data terminals) as device management units are connected over a public telephone network or the internet. In this system, the central management unit batch manages the plurality of copiers which are the devices connected to each copier management unit DT by communication between the central management unit and each copier management unit at suitable times. In FIG. 1, the type DT1 copier management unit 1 is provided with a communication means for communication over a public telephone network, and the type DT2 copier management unit 2 is provided with a communication means for communication over a the internet. In FIG. 1, the type DT1 and type DT2 copier management units 1 and 2 are shown as single devices, the respective types of copier manages may number more than two. Furthermore, although only one copier 4 is connected to the copier management unit of either type, a plurality of copiers may be connected to a single copier management unit over a local area network (LAN).

Figure 2:
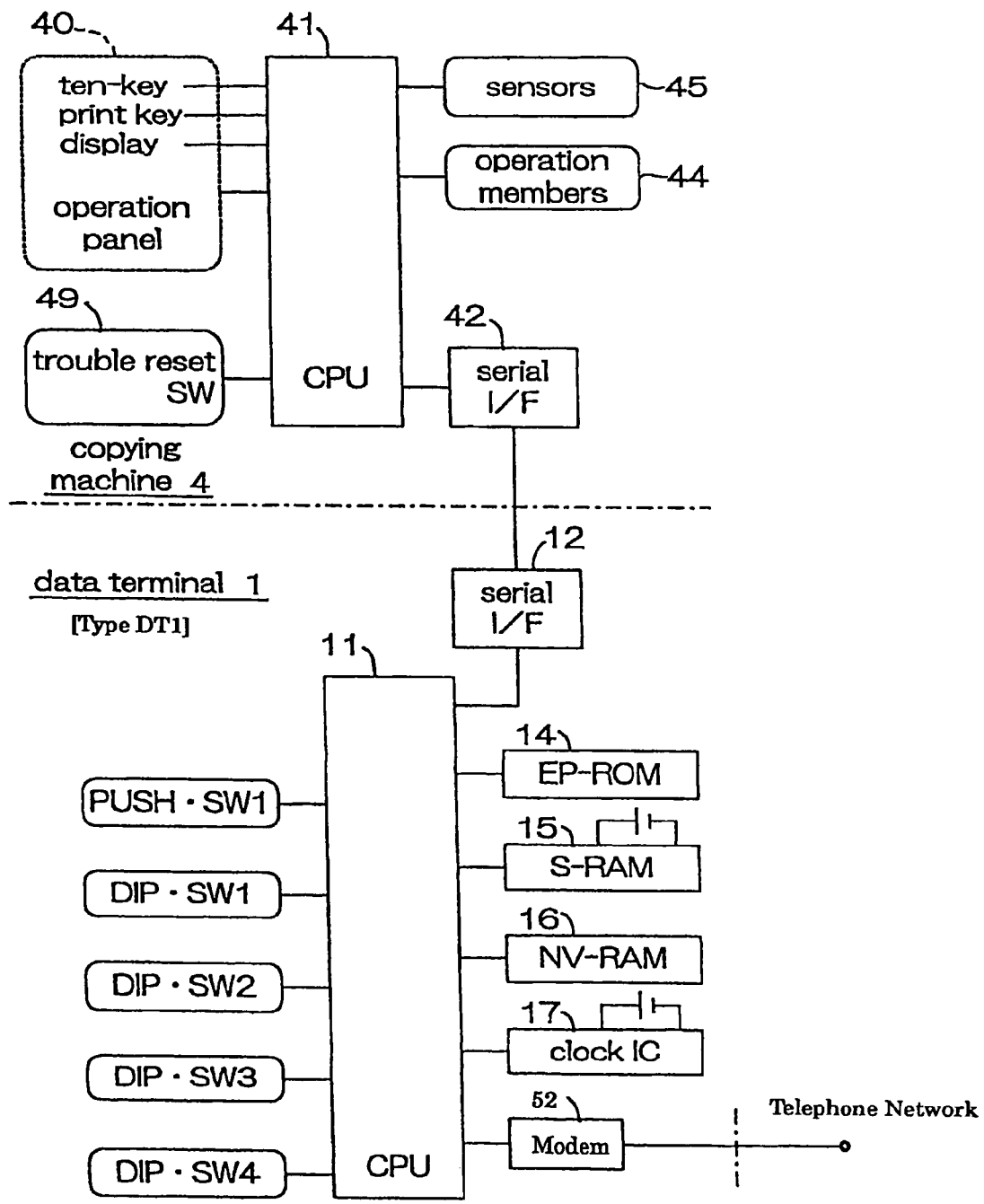
FIG. 2 is part of a circuit block diagram showing a copier management device of type DT1 in the system of FIG. 1.
Figure 3:
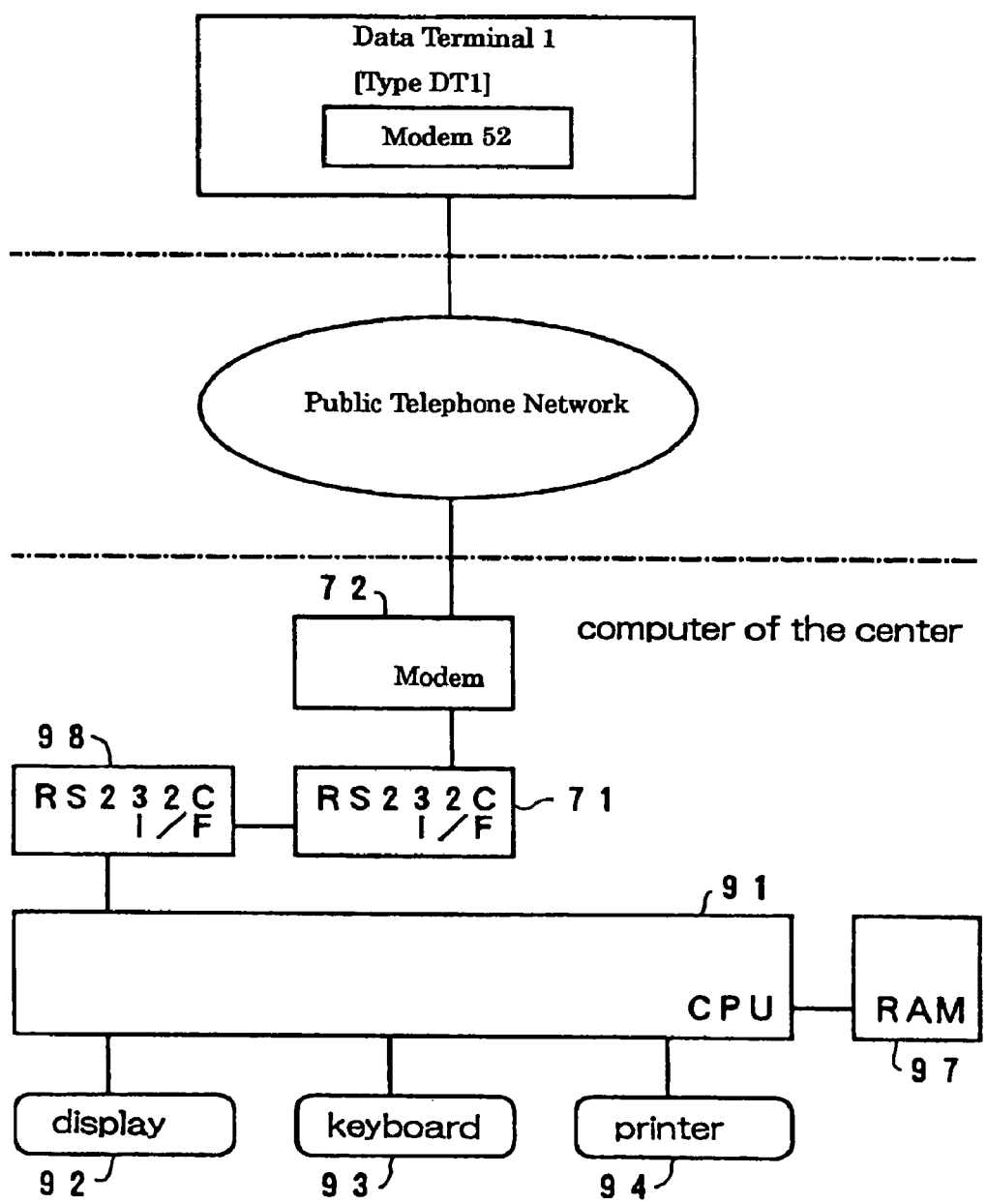
FIG. 3 is the remaining part of a circuit block diagram showing a copier management unit of type DT1 in the system of FIG. 1.
Figure 4:
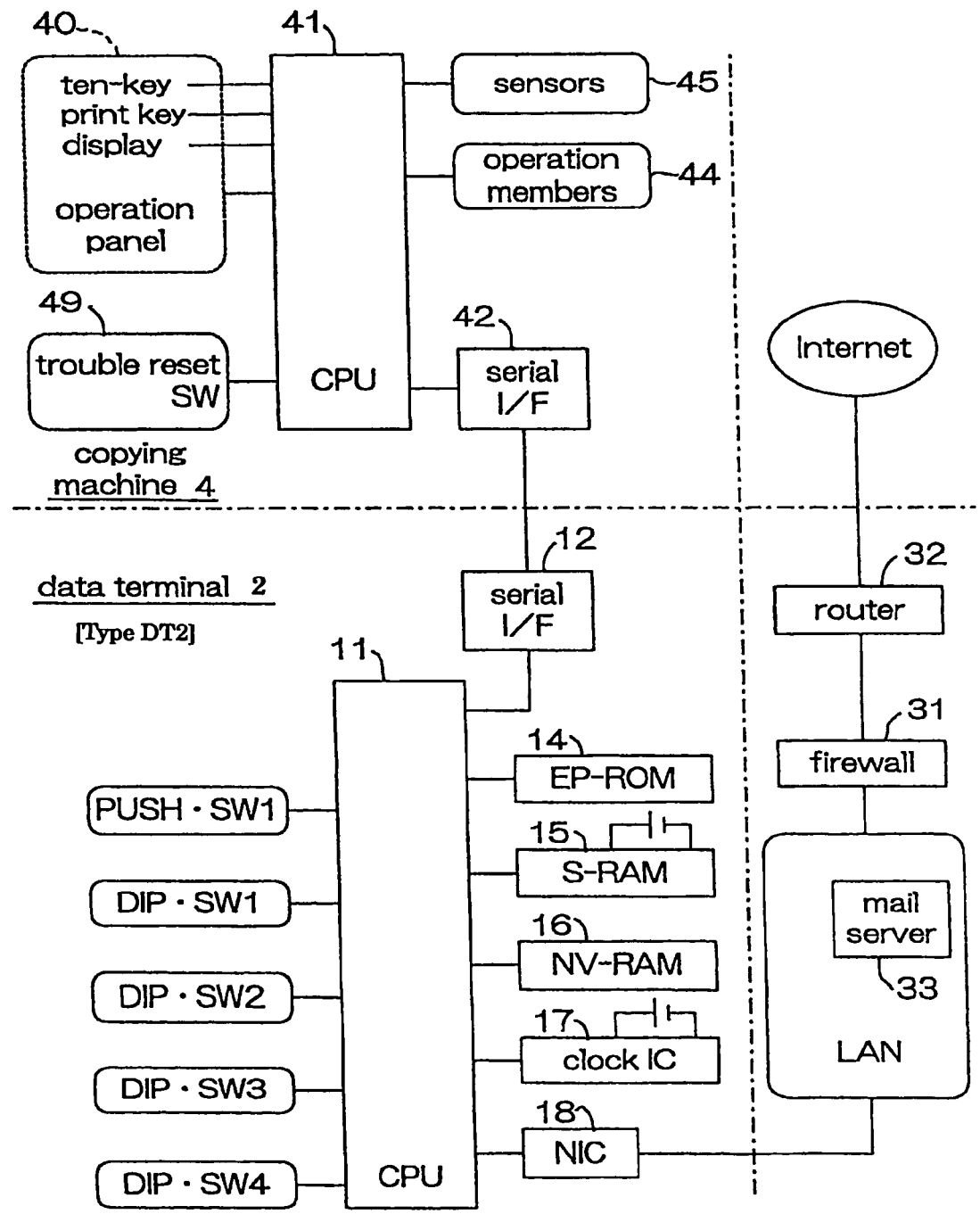
FIG. 4 is part of a circuit block diagram showing a copier management unit of type DT2 in the system of FIG. 1.
Figure 5:
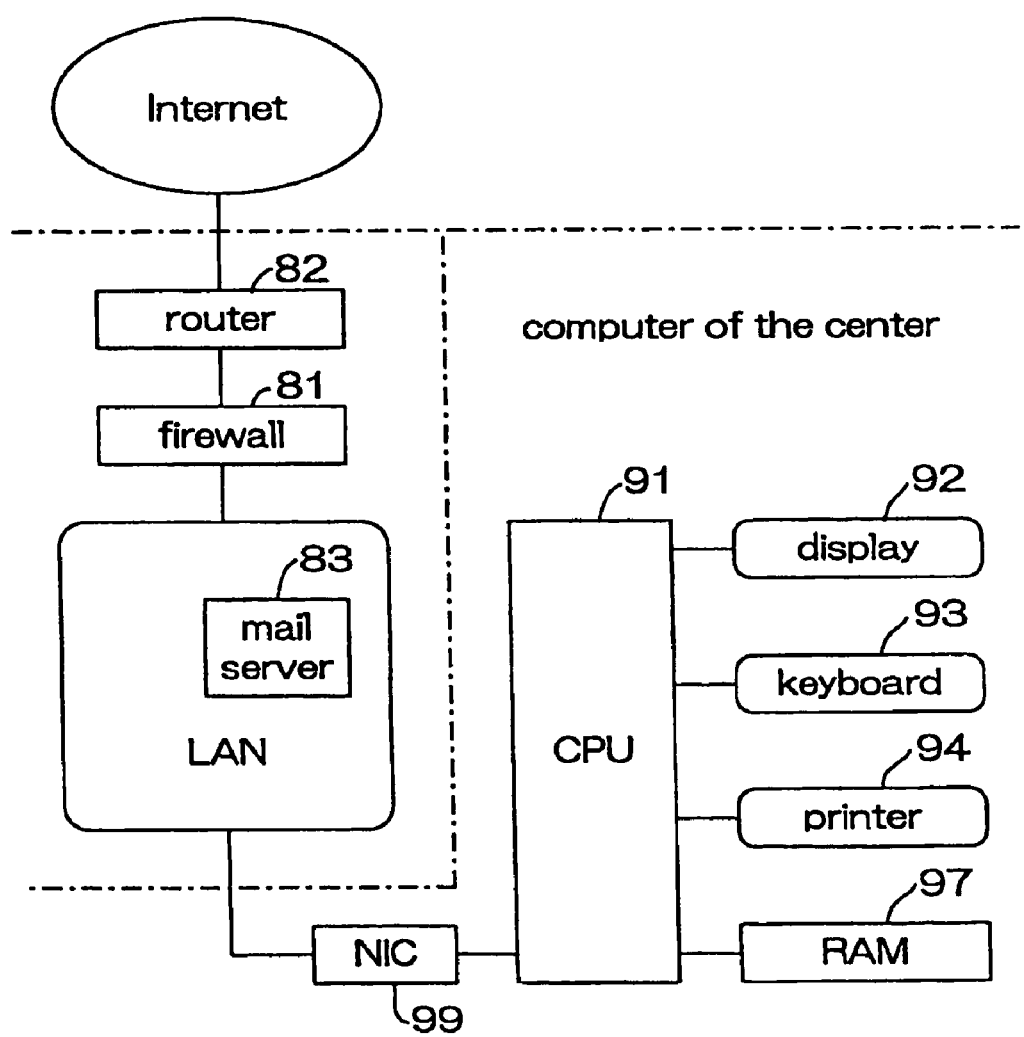
FIG. 5 is remaining part of a circuit block diagram showing a copier management device of type DT2 in the system of FIG. 1.

FIGS. 2 and 3 are block diagrams showing the connections between the central management unit and the type DT1 copier management unit, and FIGS. 4 and 5 are block diagrams showing the connections between the central management unit and the type DT2 copier, management unit. As shown in FIGS. 2 and 3, the type DT1 copier management unit 1 has an internal modem 52 connected to a public telephone network. As shown in FIGS. 4 and 5, the type DT2 copier management unit 2 has an internal network interface card (NIC) 18 for sending and receiving electronic mail (packet data) over the internet, and is connected to the internet over a local area network (LAN) via a firewall 31 and router 32. As shown in FIGS. 3 and 5, the central management unit 91 performs data communication with the two types DT1 and DT2 of copier management units. The central management unit 91 has an internal modem 72 connected to a public telephone network, as well as an internal network interface card (NIC) 99 for sending/receiving electronic mail (packet data) over the internet, and is connected to the internet over a local area network (LAN) via a firewall 81 and router 82.

(2) Structure of Each Device

(2-1) Copiers

In the CPU 41 of the copier 4 are calculated the various count values of the counter forming the basis for copy charges calculated at the central management unit (i.e., total counter representing the number of discharged sheets, sheet size differential counter representing the number of sheet used of each size), and trouble counter for each location representing the number of problems occurring at each location (i.e., PM counter used as a standard for periodic maintenance of each component). Each count value is transmitted to the CPU 11 of the data terminal (i.e., type DT1 copier management unit 1, types DT2 copier management unit 2) via the serial I/F 42 and serial I/F 12. The PM counter counts the number of uses of each component, and the count value is used, for example, as a standard for periodic component replacement.

In the copier 4, various types of element data influencing the image forming process (e.g., time required to feed a sheet, surface potential of the photosensitive drum, toner density in the developer, amount of exposure of the photosensitive drum, developing bias voltage, amount of toner adhered to the photosensitive drum, output voltage of the chargers and the like) are detected by the various types of sensors 45 arranged at suitable locations within the copier. The detected data are input to and processed by the CPU 41, and subsequently transmitted to the CPU 11 of the data terminal connected to the copier over the serial I/F 42 and the serial I/F 12.

(2-2) Copier Management Units

The copier management units (type DT1 and type DT2) receive data transmitted from the copiers under their management via serial I/F 42 and serial I/F 12. The copier management unit activates the modem (type DT1) or NIC (type DT2) and transmits data used for copier management (the previously mentioned element data and count data and the like) to the central management unit when specific calling conditions (i.e., when the transmission flag is set to ON; details described later) are satisfied.

Connected to the CPU 11 of each copier management unit of type DT1 and DT2 are a ROM 14 for storing control programs, nonvolatile memory 16 for storing the central management unit telephone number (type DT1), or mail address (type DT2), system RAM 15 used as a work area having battery backup, and clock IC 17 having a battery backup.

The CPU 11 receives data transmitted from the CPU 41 of the copier 4 via serial I/F 42 and serial I/F 12, and executes specific programs described later. The CPU 11 also performs specific operations and mode settings in accordance with operation input from various operation switches (push switch PUSH-SW21, four dip switches DIPO-SW1~DIP-SW4). The dip switch DIP-SW1 sets the input mode for entering the central management unit telephone number (type DT1) or mail address (type DT2); dip switch DIP-SW2 sets the input mode for entering the ID number (DTID) for identifying the copier management unit; dip switch DIP-SW3 sets the input mode for entering the central management unit ID number (center ID); dip switch DIP-SW4 sets the initialization mode. The push switch PUSH-SW21 specifies execution of an initial transmission or user transmission.

FIG. 6(*a*) shows the structure of 8-bit data b7~b0 input to the CPU 11 of the copier management unit from the CPU 41 of the copier 4 via serial I/F 42 and serial I/F 12. The sheet discharge code indicating sheet discharge is represented by trailing edge transition bit b0 (i.e., change from 1 to 0). The JAM code indicating a paper jam is represented by bit b7=1 and bit b6=0. The trouble code indicating various types of trouble is represented by bit b7=1 and bit b6=1. The 8-bit data are transmitted periodically from the copier 4 to the copier management unit, and also are transmitted to the copier 4 when a paper jam or trouble occurs.

In the type DT1 copier management unit, the CPU 11 functions to instruct the modem 52 to call the modem 72 of the central management unit. In this way data communication with the central management unit 91 is possible via the connection of the connection line with the modem 72 of the central management unit. On the other hand, in the type DT2 copier management unit, the CPU 11 functions to instruct the NIC 18 to send electronic mail (packet mail) to the mail address of the central management unit. In this way the content of the data sent from the CPU 11 to the central management unit 91 is determined by the type of transmission flag set to ON, as described later.

(2-3) Central Management Unit

The central management unit provided at the center of the system is a computer capable of sending and receiving data at suitable times to a plurality of user copier management units via a public telephone network (in the cause of type DT1 copier management units), and over the internet (in the case of type DT2 copier management units). The functions of the central management unit are described in detail below with reference to the flow charts.

(3) System Operation

The operation of the system shown in FIG. 1 is described below with reference to the flow charts.

The terms "ON-edge" and OFF-edge" are defined prior to the description. The change in state of a signal, switch or sensor from the OFF state to the ON state is referred to as ON-edge. The change in state of a signal, switch or sensor from the ON state to the OFF state is referred to as OFF-edge.

(3-1) Processing by Copiers

The processing performed by the CPU 41 of the copier is described below with reference to the flow chart of FIG. 6(*b*). In the CPU 41 processing is started by turning on the power. First, initialization is executed to clear memory, and set the standard mode and the like (step S41), then the processes of steeps S43 and S45 are repeated insofar as trouble does not occur.

In step S43, a reception processes for various types of input signals is batch processed. An input signal may be, for example, from the key switch group on the operation panel 40 of the copier, or the sensors 45 arranged at suitable locations within the copier. Step S45 batch executes the processes necessary for the copier operations, e.g., control of various operation elements such as sheet feed control, scan control, photosensitive drum control, developer control and the like.

When trouble occurs such as transport insufficiency (JAM), or mechanical control or operation insufficiency (step S47: YES), a signal corresponding to the trouble is sent to the CPU 11 (step S49). When the trouble reset switch 49 is operated by a user or the like (step S51: YES), a trouble reset signal is sent to the CPU 11 (step S53). The CPU 11 executes the process described below in accordance with the trouble reset signal.

(3-2) Summary of Processing by the Copier Management Units

Figure 7:
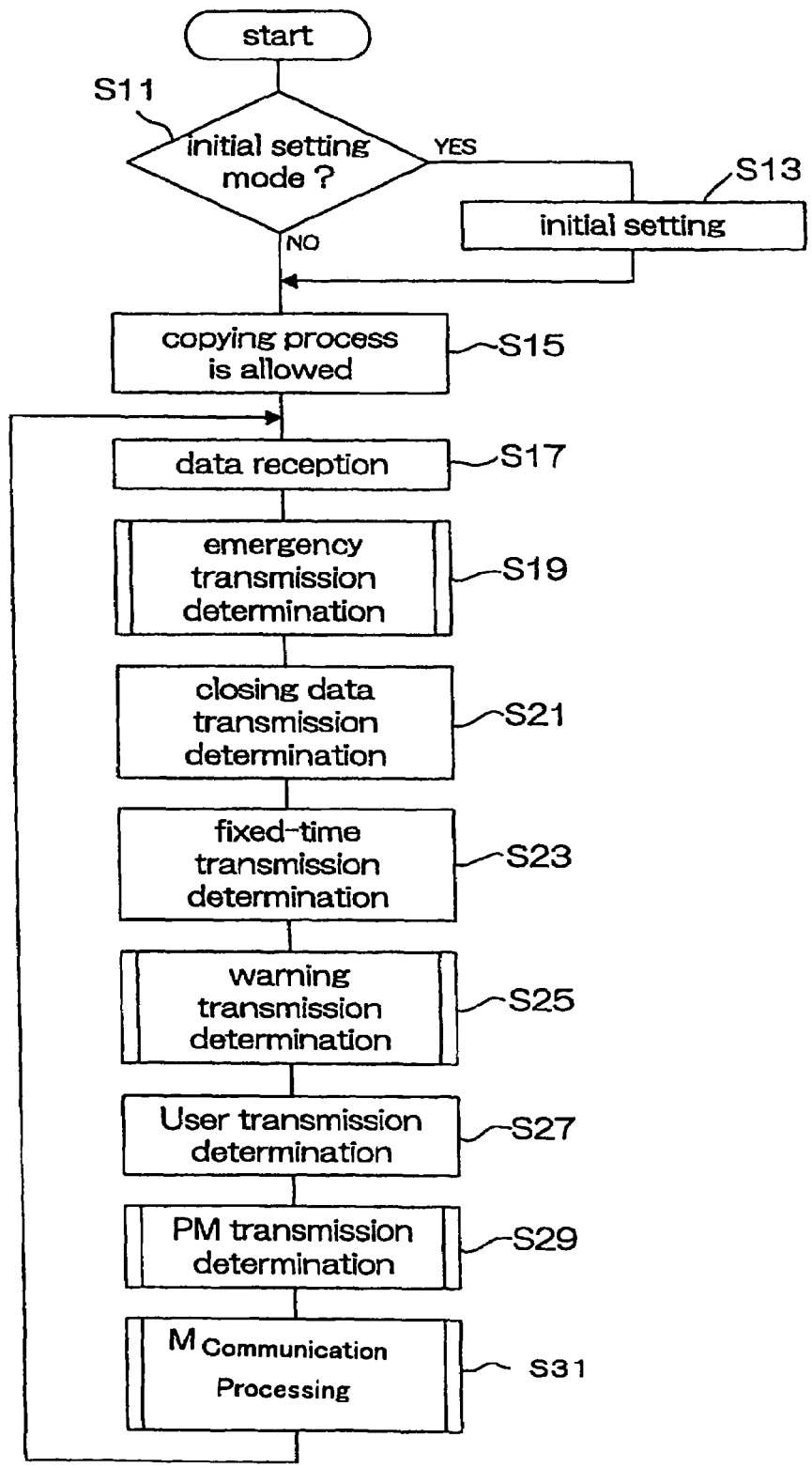
FIG. 7 is a flow chart of the process of the copier in the system of FIG. 1.
Figure 8:
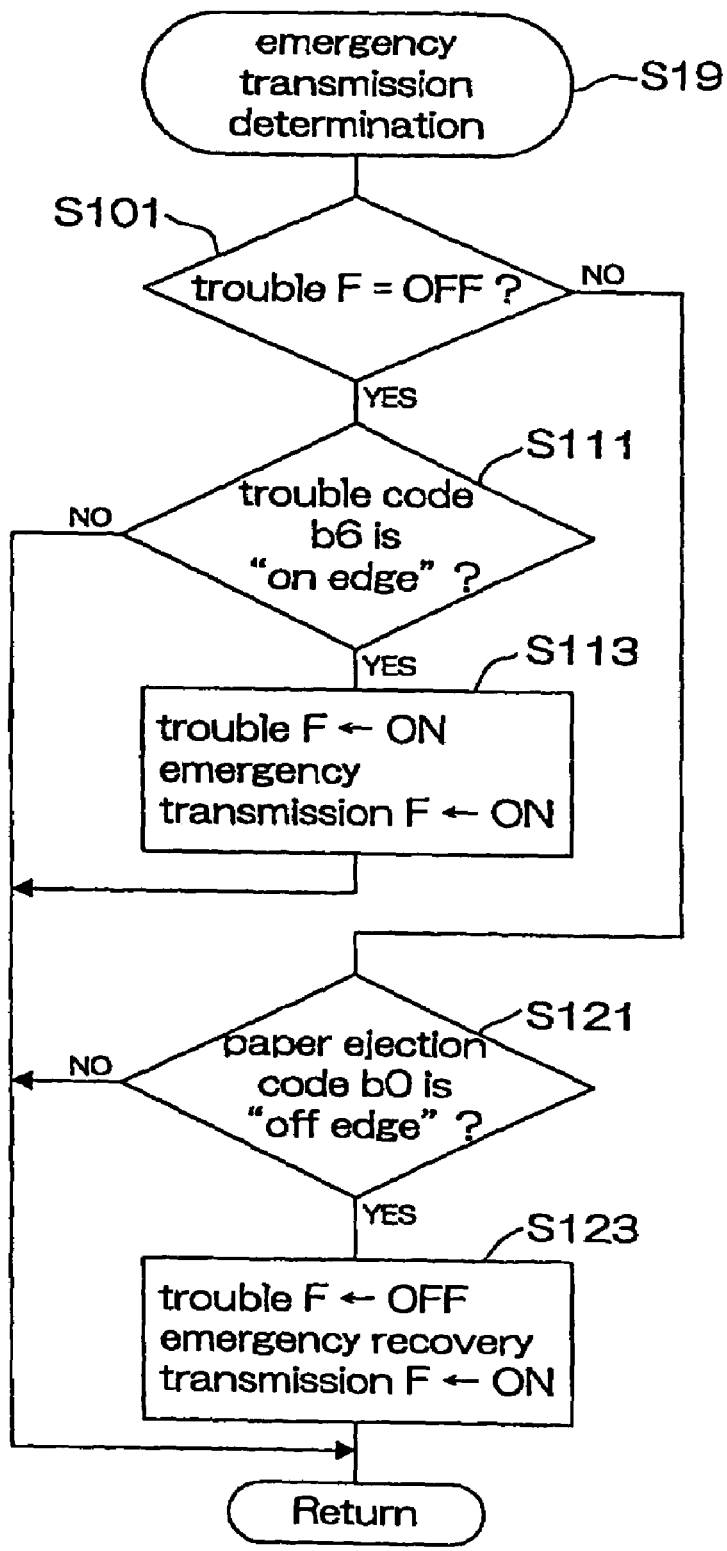
FIG. 8 is a flow chart of the emergency send process in the flow chart of FIG. 7.
Figure 9:
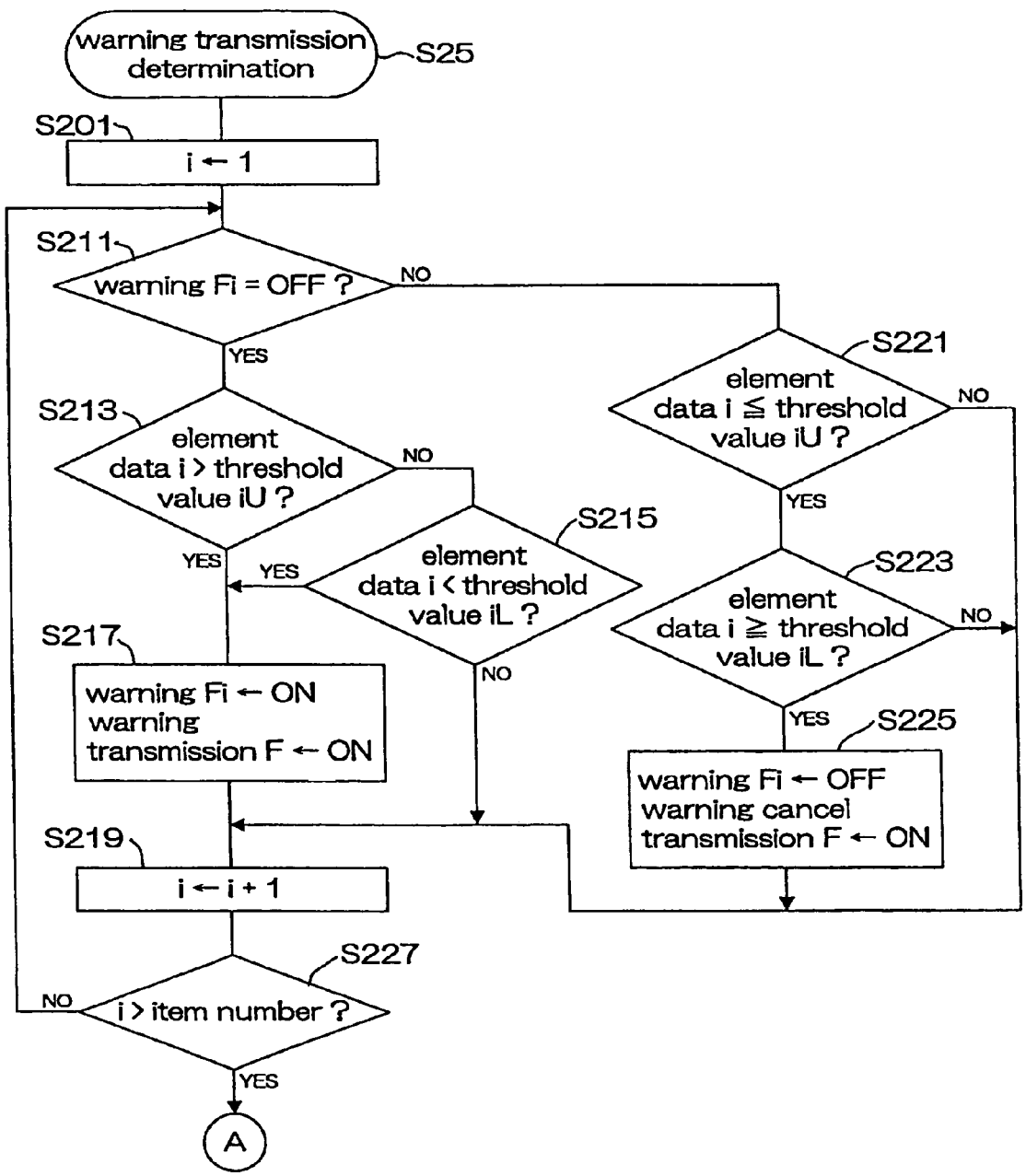
FIG. 9 is part of a flow chart of the warning send process in the flow chart of FIG. 7.
Figure 10:
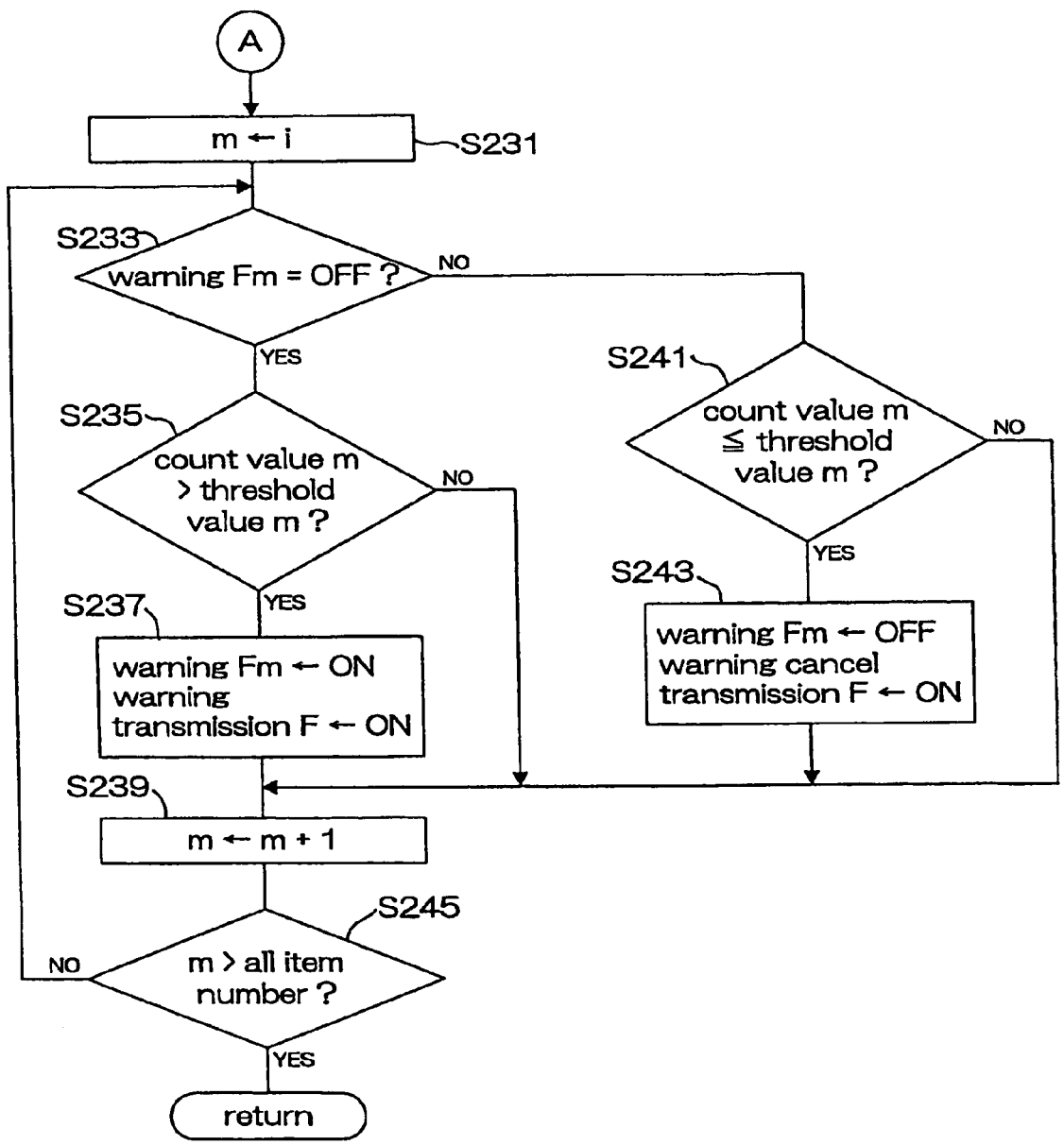
FIG. 10 is the remaining part of the flow chart of the warning send process.
Figure 11:
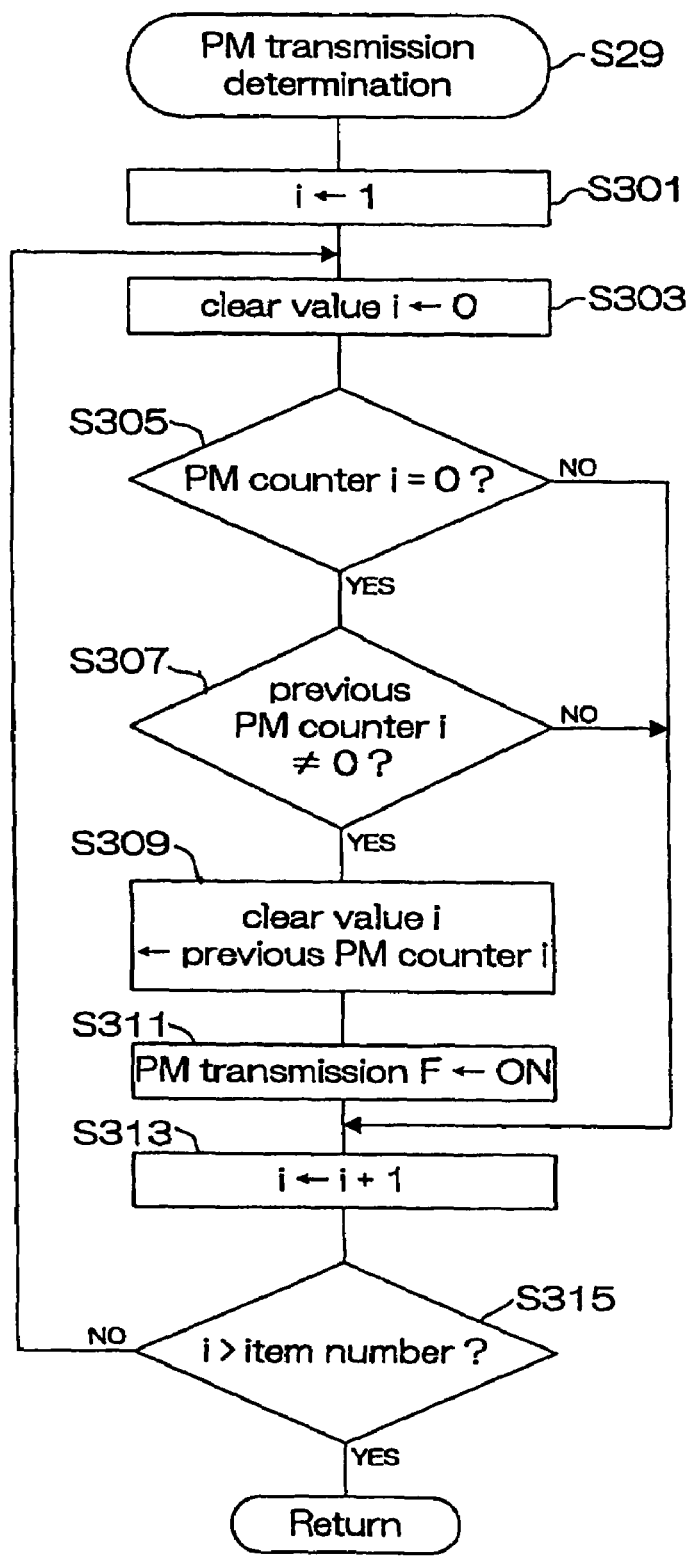
FIG. 11 is a flow chart showing the PM send process in the flow chart of FIG. 7.

The processing performed by the CPU 11 of the copier management units (type DT1 and type DT2) is summarized below with reference to the flow chart of FIG. 7.

Process in the CPU 11 starts, for example, when the power is turned on. When the initialization mode is set (step S11:

YES), the initialization process is executed (step S13), then a copy enabled signal is sent to the CPU 41 of the copier (step S15). When the initialization mode is not set (step S11: NO), the copy enabled signal is immediately sent (step S15). Then, the processes of steps S17~S31 are repeated.

The processes executed in steps S17~S31 are summarized below.

(a) Initialization Process (S13)

The initialization process is executed when the dip switch DIP-SW4 is set in the ON state at the moment processing starts in the copier management unit, i.e., when the initialization mode is set (step S11: YES). In the initialization process, the setting of the central management unit telephone number (in the case of type DT1 copier management unit) or the central management unit mail address (in the case of the DT2 copier management unit), the copier management unit ID number (DTID), and the central management unit ID number (center ID) are set and the initial transmission is executed.

(b) Data Reception (S17)

The reception process is executed for various types of data relating to the condition of the copier sent from the CPU 41. The content of the data includes sheet discharge code, JAM/trouble code, JAM-trouble count value, sheet size differentiated count value, PM count value, and element data value. The latest values for these data are normally saved by the CPU 11.

(c) Emergency Transmission Determination (S19)

Processes for determining whether or not to send trouble data or trouble recovery data to the central management unit, and for turning ON and OFF the corresponding flags based on the determination result are executed as described later.

(d) Closing Transmission Determination (S21)

The closing transmission flag is set to ON at a predetermined closing transmission time. In this way the total count value forming the basis for calculating copy charges, and the sheet size discriminated count value are sent to the central management unit. After transmission ends, the next closing transmission time data are sent back from the central management unit.

(e) Fixed-time Transmission Determination (S23)

The fixed-time transmission flag is set to ON at the predetermined fixed-time transmission time. In this way the various data describing the condition of the copier are sent to the central management unit as previously described. After the transmission ends, the current time data and the next fixed-time transmission date and time data are sent back by the central management unit.

(f) Warning Transmission Determination (S25)

The element data, JAM counter count value, and PM counter count value are compared to their respective predetermined threshold values as described later. A determination is made as to whether or not to send warning data and warning cancel data based on the comparison result. Processes are then executed to turn ON/OFF the corresponding flags based on the determination result.

(g) User Transmission Determination (S27)

When the push switch PUSH-SW21 is pressed when the initialization mode is not set, the user transmission flag is set to ON. In this way the previously mentioned various types of data relating to the condition of the copier are sent to the central management unit.

(h) PM Transmission Determination (S29)

The count value prior to clearing of the count value to [0] by component replacement is sent to the central management unit.

(i) Communication Process (S31)

When any communication flag is set to ON, the communication process with the central management unit is executed. In the type DT1 copier management unit, a connection is made with the central management unit over a communication line, and data are sent to the CPU 91 by the communication process (described later) shown in FIGS. 12 and 13. In the type DT2 copier management unit, electronic mail (packet data) are sent to the CPU 91 by the communication process (described later) shown in FIG. 14.

(3-3) Details of the Various Processes of the Copier Management Units

Details of the various processes of the CPU 11 of the copier management units (type DT1 and type DT2) are described with reference to the flow charts of FIGS. 8~14.

(3-3-1) Emergency Transmission Determination

The emergency transmission and emergency recovery transmission are managed in this process.

For example, when the trouble flag is set to the OFF condition (step S101: YES) and the trouble code b6 ON-edge state is detected from the copier (step S111: YES), the trouble flag and emergency transmission flag are set to the ON state (step S113).

When the trouble flag is set to the ON state (step S101: NO) and a sheet discharge code b0 OFF-edge state is detected from the copier (step S121: YES), the trouble flag is reset to OFF, and the emergency recovery transmission flag is set to ON (step S123). The processes of steps S121~S123 are based on the sheet being discharged from the copier, and recovery from the trouble.

When the emergency transmission flag or the emergency recovery transmission flag are set to ON, the communication process is executed, and trouble data (when the emergency transmission flag is ON) or trouble recovery data (when the emergency recovery transmission flag is ON) are sent to the CPU 91 of the central management unit via the connected communication line (in the case of the type DT1 copier management unit) or via electronic mail (in the case of type DT2 copier management unit).

(3-3-2) Warning Transmission Determination

This process manages the warning transmission and warning cancellation transmission.

Steps S201~S227 are processes to execute a warning transmission when an element data value is outside an inherent allowable range, and execute a warning cancellation transmission when the value returns to the allowable range.

First, the initial value of [1] is set for the item number representing classification of element data (step S201).

In step S211, a warning flag is determined for the element data specified by the item number i (initially the element data of the first item number). As a result, if the warning flag relating to this element data is set to OFF (step S211: YES), a check is made to determine whether or not the element data value is within a range above a minimum value iL. When the data value is outside the allowable range (step S213: YES or step S215: YES), the warning flag Fi relating to this element data and the warning transmission flag are set to ON (step S217). In this way the communication process is executed, and a warning data transmission is executed to the central management unit.

On the other hand, when the warning flag of the element data specified by item number is set to ON (step S211: NO), a check is made to determine whether or not the element data value has returned to within the allowable ranges If the value has returned to the allowable range (S221: YES, or S223: YES) the warning flag Fi relating to this element data is reset to OFF, and the warning cancellation transmission flag is set to ON (step S225). In this way a communication process is executed, and the warning cancellation data are transmitted to the central management unit.

When this process is executed in relation to all element data (step S227: YES), the processes of step S231 and subsequent steps are executed.

Steps S231~S245 are processes to execute a warning transmission when the count values of the JAM counter and PM counter exceed an inherent threshold value, and execute a warning cancellation transmission when the counter values return to less than the threshold value.

First, an initial value [i] (the value of the final item number of element data+1) is set for item number m representing the classification of the JAM counter and the PM counter (step S231).

Then, in step S233, a warning flag relating to the JAM counter or PM counter specified at item number m is determined. as a result, if the warning flag relating to the JAM counter or the PM counter is set to OFF (step S233: YES), a determination is made as to whether or not the counter value is within the inherent allowed range of the counter, i.e., does not exceed the threshold m, and if the value exceeds the threshold (step S235: YES), the counter warning flag Fm and the warning cal flag are set to ON (step S237). In this way the communication process is executed, and warning data are transmitted to the CPU 91 of the central management unit.

On the other hand, if the warning flag of the JAM counter or the PM counter specified by item number m is set to ON in step S233 (step S233: NO), a check is made to determine whether or not the counter value has returned to less than the threshold value. When the counter value is less than the threshold value (step S241: YES) the warning flag Fm relating to this counter is reset to OFF, and the warning cancellation flag is set to ON. In this way a communication process is executed and the warning cancellation data are transmitted to the CPU 91 of the central management unit.

When this process has bee executed for all JAM counter and PM counters (step S245: YES), the routine returns to the main routine.

The warning transmission and the warning cancellation transmission are managed in this way.

(3-3-3) PM Transmission Determination

This process manages the PM transmission.

First, the initial value [i] is set for the item number representing classification of the PM counter (step S301). Then, the processes of steps S303~S311 are executed, and thereafter the value of i is incremented (step S313), and the process is repeated. That is, the PM counter classification changes as this process is repeated.

Steps S303~S311 are processes for clearing the PM counter (step S305: YES, step S307: YES), saving the counter value directly prior to clearing the PM counter (step S309), and setting the PM transmission flag to ON (step S311). Clearing the PM counter is executed by service personnel when the part corresponding to the PM counter is replaced. When the PM counter flag is set to ON (step S311), the communication process is executed, and the PM data (count value before part replacement and the classification of the replaced part) are transmitted to the central management unit.

(3-3-4) Communication Processes

Figure 12:
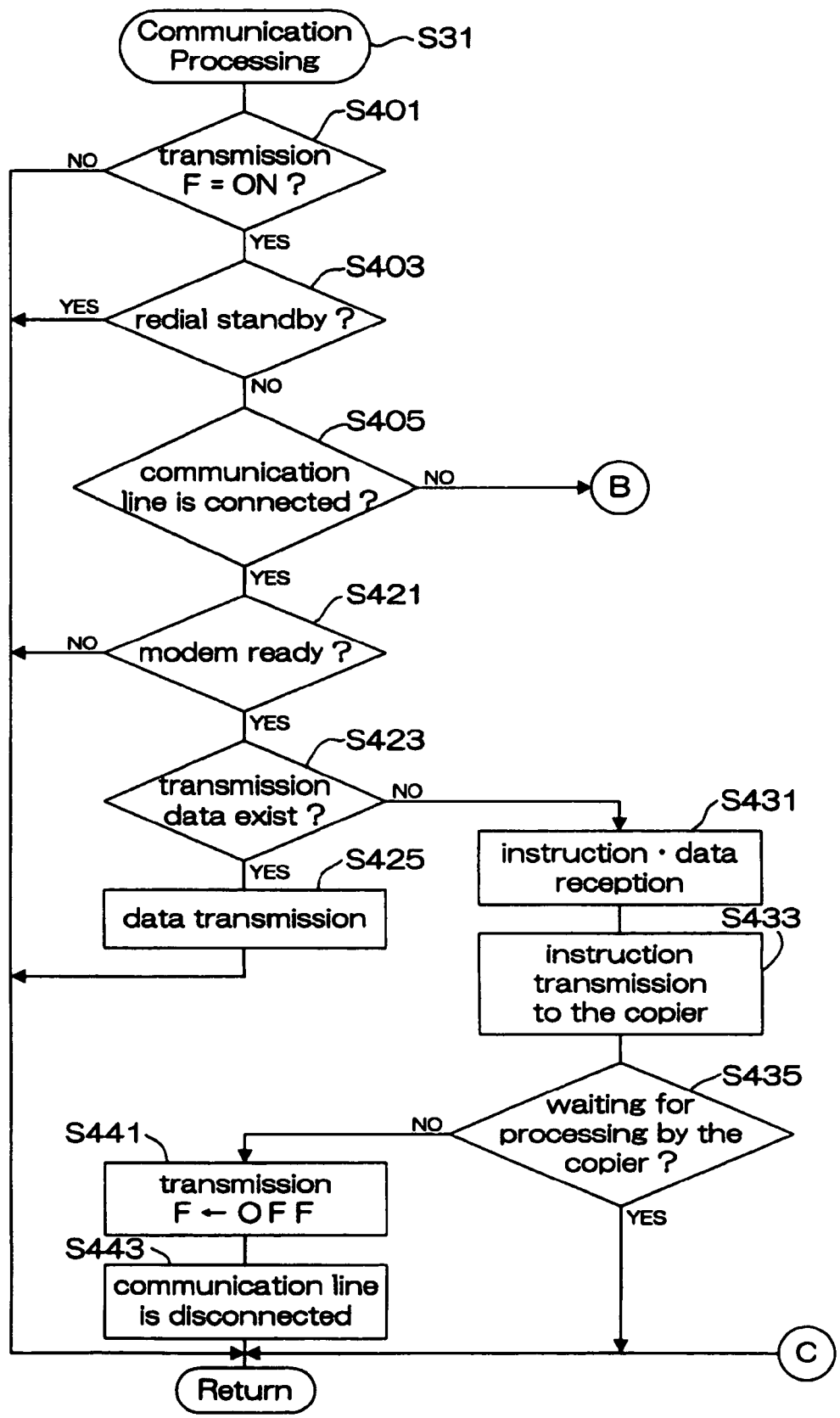
FIG. 12 is part of a flow chart of the communication process for the type DT1 in the flow chart of FIG. 7.
Figure 13:
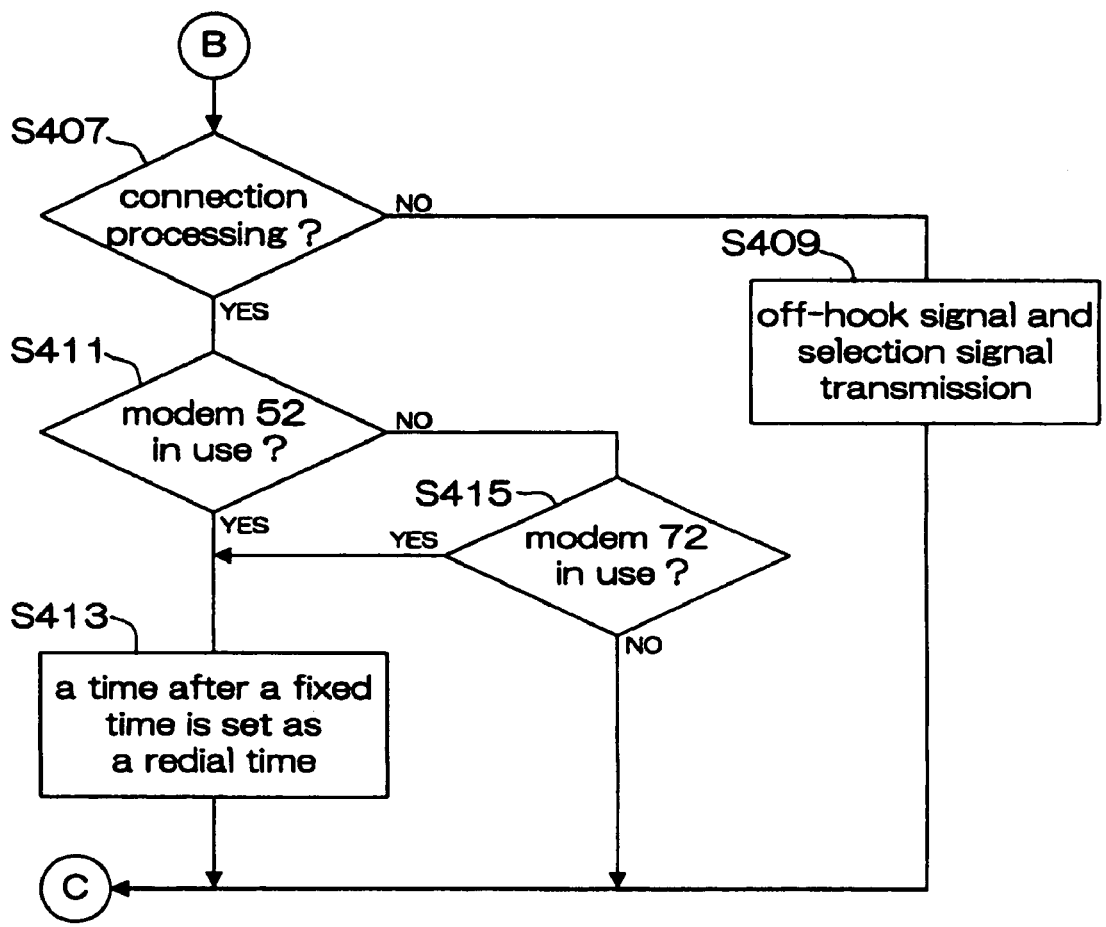
FIG. 13 is the remaining part of the flow chart of the communication process for the type DT1 in the flow chart of FIG. 7.
Figure 14:
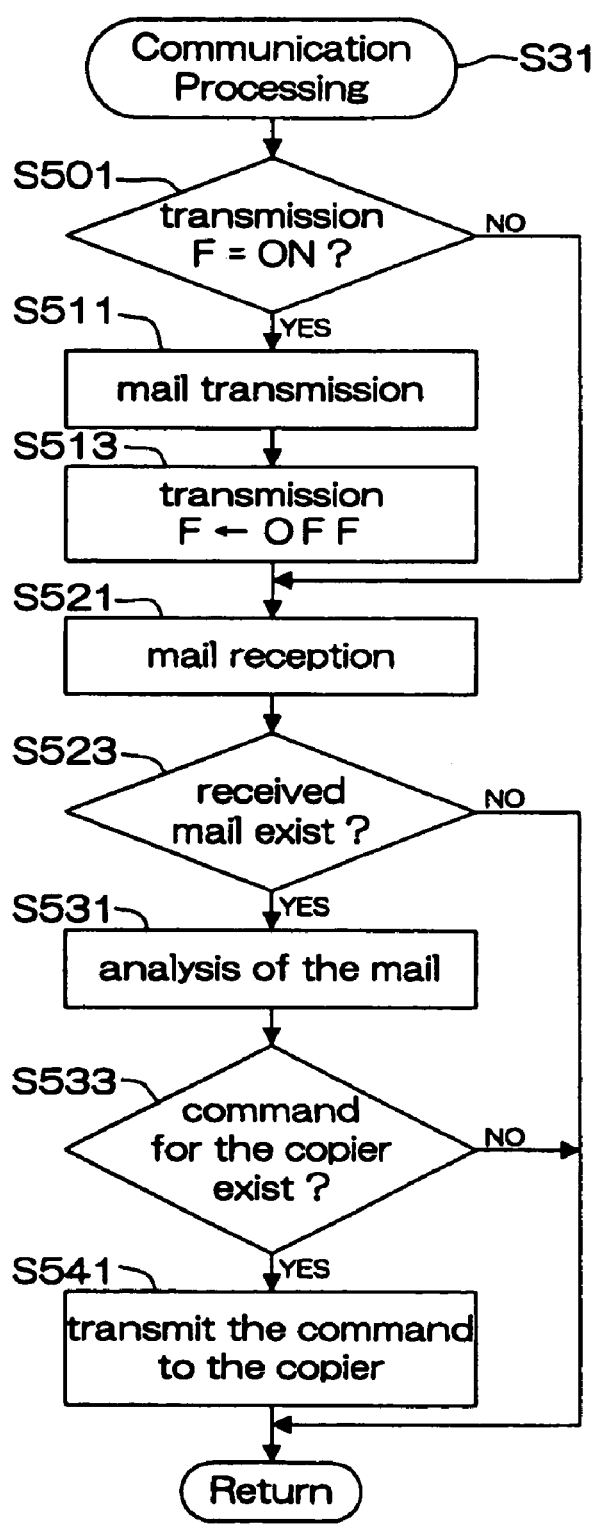
FIG. 14 is a flow chart of the communication process for the type DT2 in the flow chart of FIG. 7.
Figure 15:
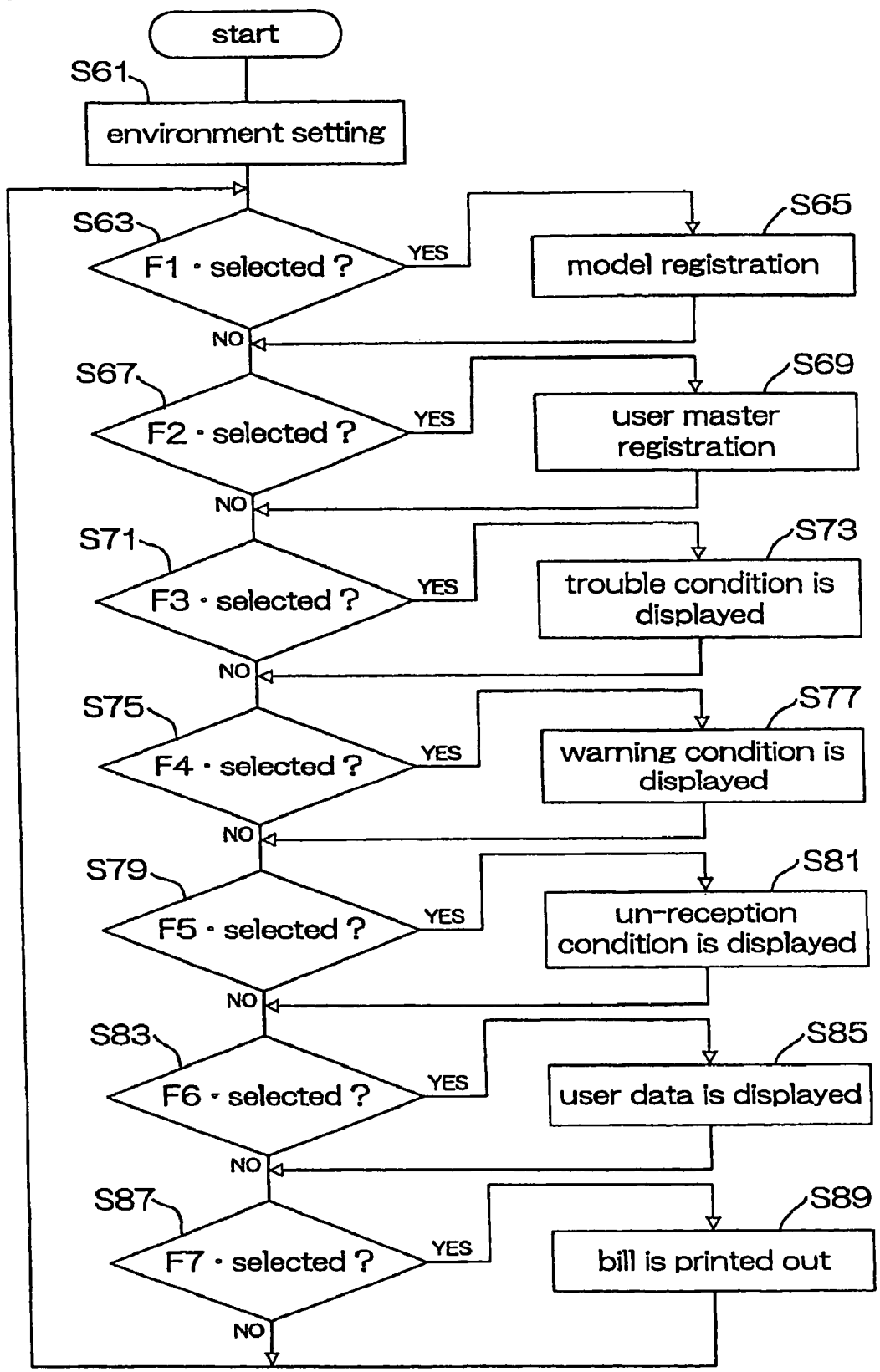
FIG. 15 is a flow chart of the key process in the central management apparatus in the system of FIG. 1.

The type DT1 copier management unit executes the processes of FIGS. 12 and 13, to connect the communication line with the central management unit, and accomplish data communication. The type DT2 copier management unit executes the process of FIG. 14 to transmit electronic mail (packet data) to the central management unit over the internet.

(3-3-4-1) Communication Process for Type DT1

When any transmission flag is set to ON in the type DT1 copier management unit, a connection is made via the telephone line to the central management unit, and data corresponding to the turned ON transmission flag is transmitted. Then, data from the central management unit are received.

First, when any transmission flag is set to ON (step S401: YES), instructions are sent to the internal modem 52 to call the modem 72 of the central management unit (step S409) under the condition that the current state is not redial standby (step S403: NO), the telephone line is not connected to the modem 72 of the central management unit (step S405: NO), the state is not standby after the internal modem 52 has been instructed to call the modem 72 of the central management unit (step S407: NO).

When the result of the process of step SS409 is that the modem 72 of the central management unit cannot be called because, for example, a telephone device attached to the telephone line is in use (step S411: YES), a time after a fixed time is set as a redial time (step S413). In this way the determination in step S403 is YES until the redial time arrives. That is, the process of step S409 is not executed. When the redial time arrives, instructions are again sent to the internal modem 52 to call the modem 72 of the central management unit (step S409).

When, as a result of the transmission of the selected signal to the central management unit over the telephone line from the modem 52, it is determined that the modem 72 of the central management unit is currently in use (including when there is no response from the CPU 91 even though a connection is made to the modem 72) (step S415: YES), the redial time is set in the aforesaid manner (step S413), and when the set redial time arrives, the process of step S409 is again executed.

when the result of the transmission of the selected signal from the modem 52 to the central management unit over the public telephone line via the process of step S409 is a connection with the modem 72 of the central management unit over the telephone line (step S405: YES), after the modem 52 attains the ready standby state (step S421: YES), the data related to the turned ON cal flag are transmitted to the central management unit (step S425).

Figure 16:
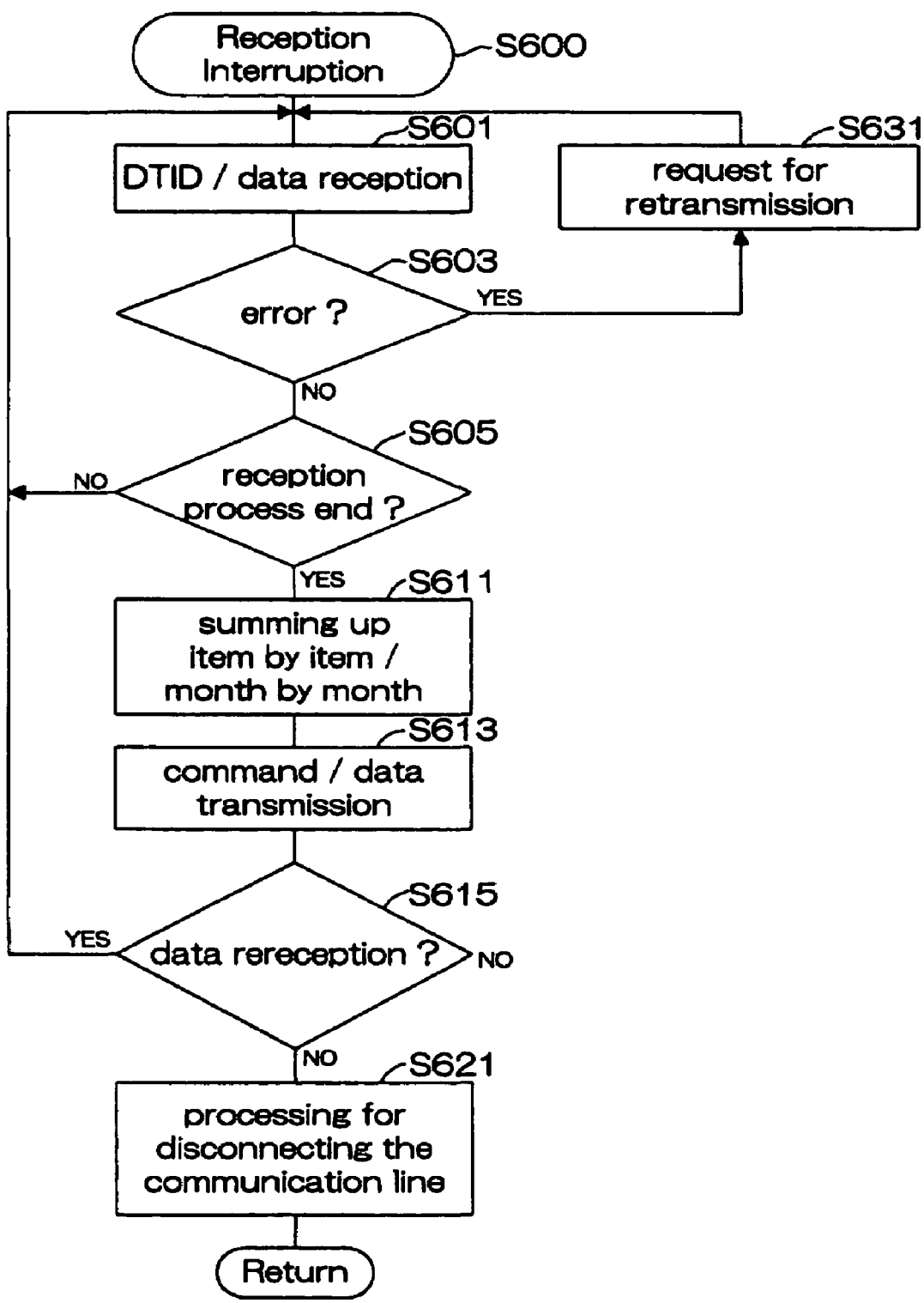
FIG. 16 is a flow chart of the process by an reception interruption from the type DT1 copier management unit in the central management apparatus of the system of FIG. 1.

Then, when all data for transmission have been transmitted to the central management unit (step S423: NO), data sent from the central management unit are received (step S431). The data transmission process from the central management unit is shown in FIG. 16.

The received data are, for example, instruction for changing the set conditions of the copier (setting change instruction), instruction requesting copier operation (operation instruction), current time, next fixed-time transmission date and time, next closing transmission date and time and the like. When a communication error occurs, a data retransmit instruction is received.

When a setting change instruction or operation instruction is received in step S431, the parameters and command corresponding to the instruction are sent to the CPU 41 of the copier via the serial I/F 42 and serial I/F 12 (step S433).

Figures 6A, 6B:
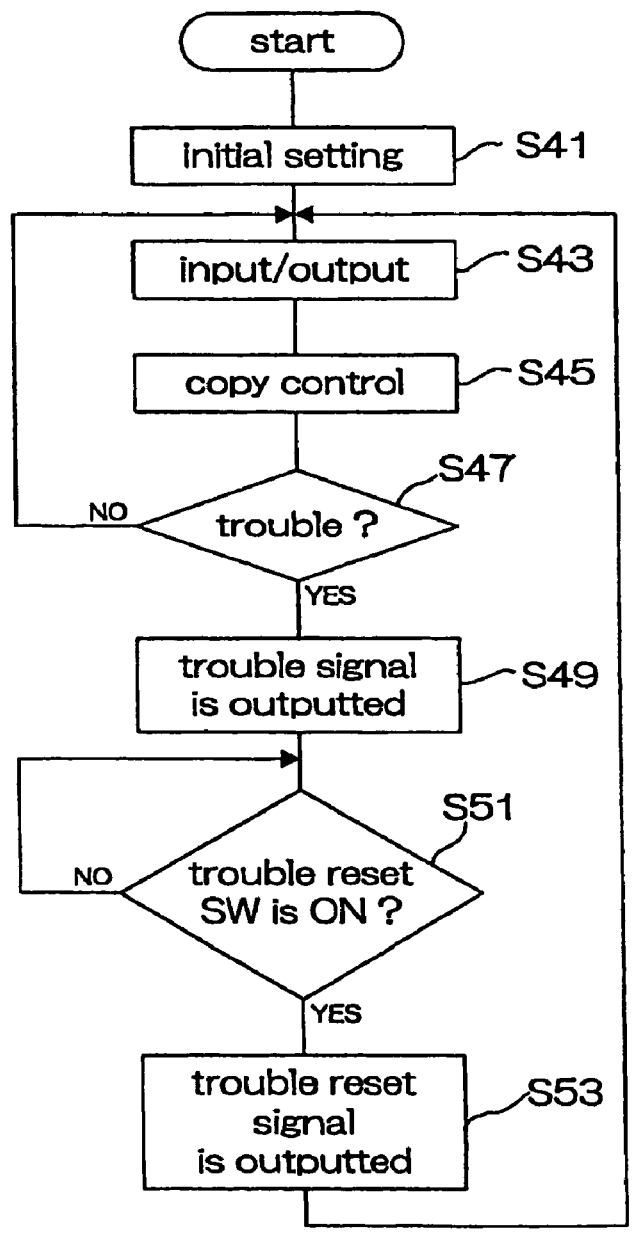
FIG. 6(*a*) illustrates the code transmitted from the copier to the copier management unit in the system of FIG. 1, and FIG. 6(*b*) is a flow chart of the process of the copier in the system of FIG. 1.

Processes corresponding to this command are executed by the copier in step S43 of the previously discussed FIG. 6(b).

When data are received from the central management unit and these data must wait for processing by the copier (step S435: YES), the connection with the central management unit over the telephone line is maintained. When required to wait of the end of processing by the copier, for example, when the developing device is operated to detect the toner density, the results can be obtain in a relatively short time. After this wait period, when data are transmitted from the copier (step S423: YES), these data are transmitted to the central management unit (step S425).

On the other hand, when it is not necessary to wait for the end of processing by the copier (step S435: NO), the transmission flag is reset to OFF (step S441), and thereafter the communication line is disconnected (step S443).

Data communication is accomplished by the type DT1 copier management unit while maintaining the connection state of the telephone line with the central management unit as described above.

(3-3-4-2) Communication Process for Type DT2

When any transmission flag is set to ON in the type DT2 copier management unit, a process is executed to transmit the data content corresponding to the cal flag as electronic mail (packet mail) to the central management unit. Furthermore, processing is executed to read electronic mail received from the central management unit.

First, when any transmission flag is set to ON (step S501: YES), data corresponding to the turned ON transmission flag are transmitted as electronic mail to the central management unit (step S511). Thereafter, the transmission flag is set to OFF (step S513). When the mail transmission fails, a process is executed to retransmit the mail (not illustrated).

In step S521, whether or not there is electronic mail from a copier management unit is read from the mail server 33. When there is electronic mail from a copier management unit (step S523: YES), the mail is read from the mail server 33, and the content is analyzed (step S531). The content of the electronic mail includes, for example, instruction for changing the set conditions of the copier (setting change instruction), instruction requesting copier operation (operation instruction), current time, next fixed-time transmission date and time, next closing transmission date and time and the like.

When there is no electronic mail from a copier management unit (step S523: NO), the mail transmission/reception process ends.

When the result of the analysis of step S531 includes a setting change instruction or operation instruction (step S533: YES), the parameters and commands corresponding to the instruction are transmitted to the CPU 41 via the serial I/F 42 and serial I/F 12 (step S541). In this way the copier executes processes corresponding to the commands. When the result of analysis in step S531 finds the received data do not include a setting change instruction or operation instruction (step S533; NO), the mail transmission/reception process ends.

The type DT2 copier management unit sends and receives data with the central management unit by electronic mail transmission/reception.

(3-4) Processing by the Central Management Unit

Processes performed by the central management unit are described below with reference to the flow charts of FIGS. 15~18.

(3-4-1) F1~F7 Key Processes

The CPU 92 of the central management unit starts processing when the power is turned on; first, modem and printer environmental settings are executed (step S61). The environmental settings of the modem 72 comprise, for example, dial mode, automatic or manual transmit/receive and the like. Thereafter, the mode is set in accordance with the input operation of the F1~F7 keys, and the processes described below are executed.

(a) F1 Key Operation

The device record reception mode is set (step S65). That is, a new record including the device name, number of items of element data, name of each element data standard threshold value of each element data, standard threshold value of count data and the like is received.

(b) F2 Key Operation

The user master record reception mode is set (step S69). That is, a new record including user name, address, telephone number, device name, device number, fixed-time transmission date and the like is received. The copier management unit ID (DTID) is automatically set.

The type of the copier management unit managing the copiers is also set (i.e., type DT1, type DT2).

(c) F3 Key Operation

The trouble condition is displayed (step S73). That is, the user information (user name, address, telephone number, device name) of the copier executing the emergency transmission, trouble date and time and the like are displayed on the display 92 together with the trouble content. The number of trouble incidents is normally displayed in the corner of the display 92 unrelated to the F3 key operation.

(d) F4 Key Operation

The warning state is displayed (step S77). That is, the user information of the copier executing the warning transmission, and warning content are displayed on the display 92 together. The number of warning incidents is normally displayed in the corner of the display 92 unrelated to the F4 key operation.

(e) F5 Key Operation

The no reception condition is displayed (step S81). That is, the user information of the copier from which fixed-time transmission data have not been received are displayed on the display 92 by the no reception determination process (FIG. 18) described later. The number of no reception incidents is normally displayed in the corner of the display 92 unrelated to the F5 key operation.

(f) F6 Key Operation

This sets the user data display mode (step S85). That is, when a user is selected, the user information is displayed on the display 92. When a sub menu is selected, the count value of each type counter (total counter, sheet size differentiated counter, JAM counter, trouble counter, PM counter) of the user's copier and element data are displayed by month or item.

(g) F7 Key Operation

A charge bill is printed out (step S89). A printer connected to the central management unit is activated, and copy charges calculated based on count value of the total counter and a predetermined calculation method is printed.

(3-4-2) Type DT1 Data Transmission/Reception

FIG. 16 shows the data transmission/reception process when the type DT1 copier management unit is connected by a telephone line. This process is activated by a reception interruption.

When a reception interruption is generated, the CPU 91 sequentially receives data transmitted from the copier management unit side, and subjects the received data to predetermined processing (step S600). First, the DTID and data reception process is executed (step S601). When a communication error occurs (step S603: YES), a request for retransmission is sent to the copier management unit (step S631).

When the reception process ends (step S605: YES), item and monthly totals are calculated, and screen display data are created by user selection (refer to step S85 of FIG. 15) (step S611).

If the current communication is based on the fixed-time transmission, the data of the next fixed-time transmission, i.e., fixed-time transmission date and time, closing transmission date and time, current time, are transmitted to the copier management unit (step S613). Thereafter, when data are not sent back from the copier management unit (step S615: NO), a process for disconnecting the communication line is executed (step S621). In this way the interrupt process ends. When data are sent back from the copier management unit in step S615, the data reception process is executed again (step S601).

(3-4-3) Type DT2 Data Transmission/Reception

Figure 17:
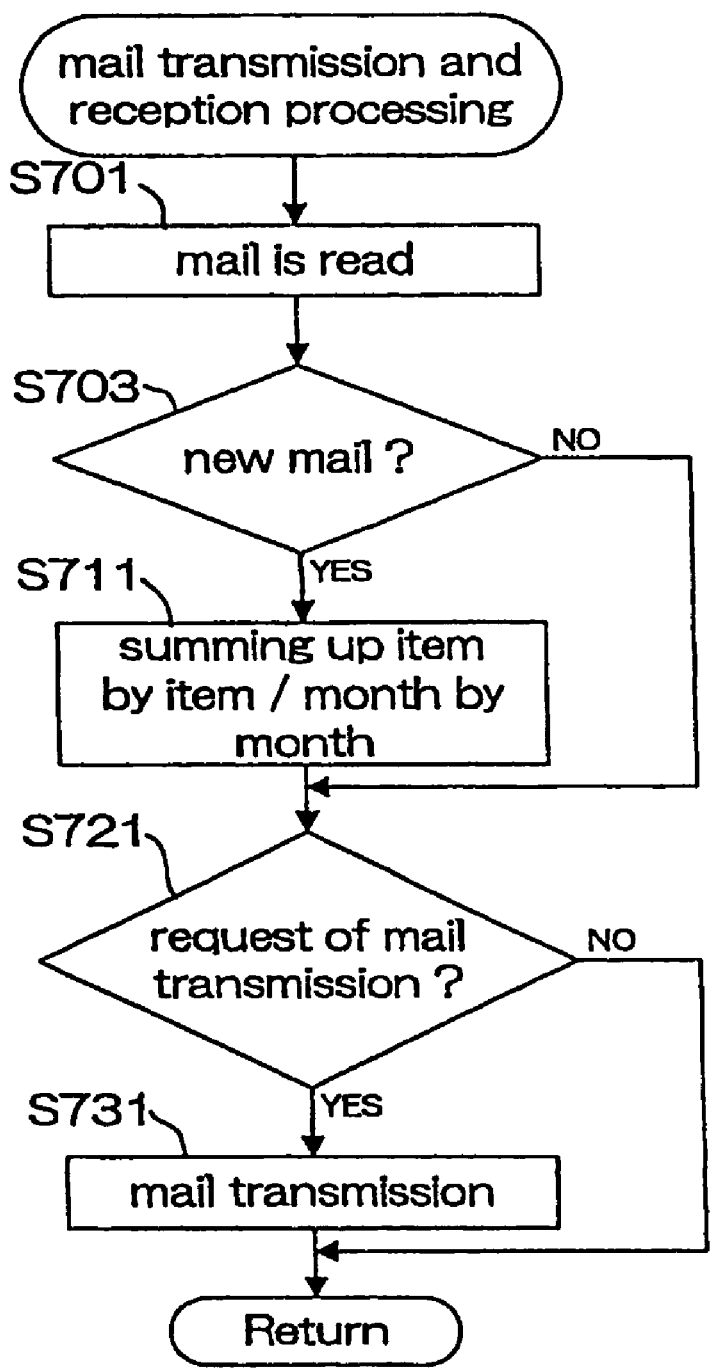
FIG. 17 is a flow chart of the process by an reception interruption from the type DT2 copier management unit in the central management apparatus of the system of FIG. 1.
Figure 18:
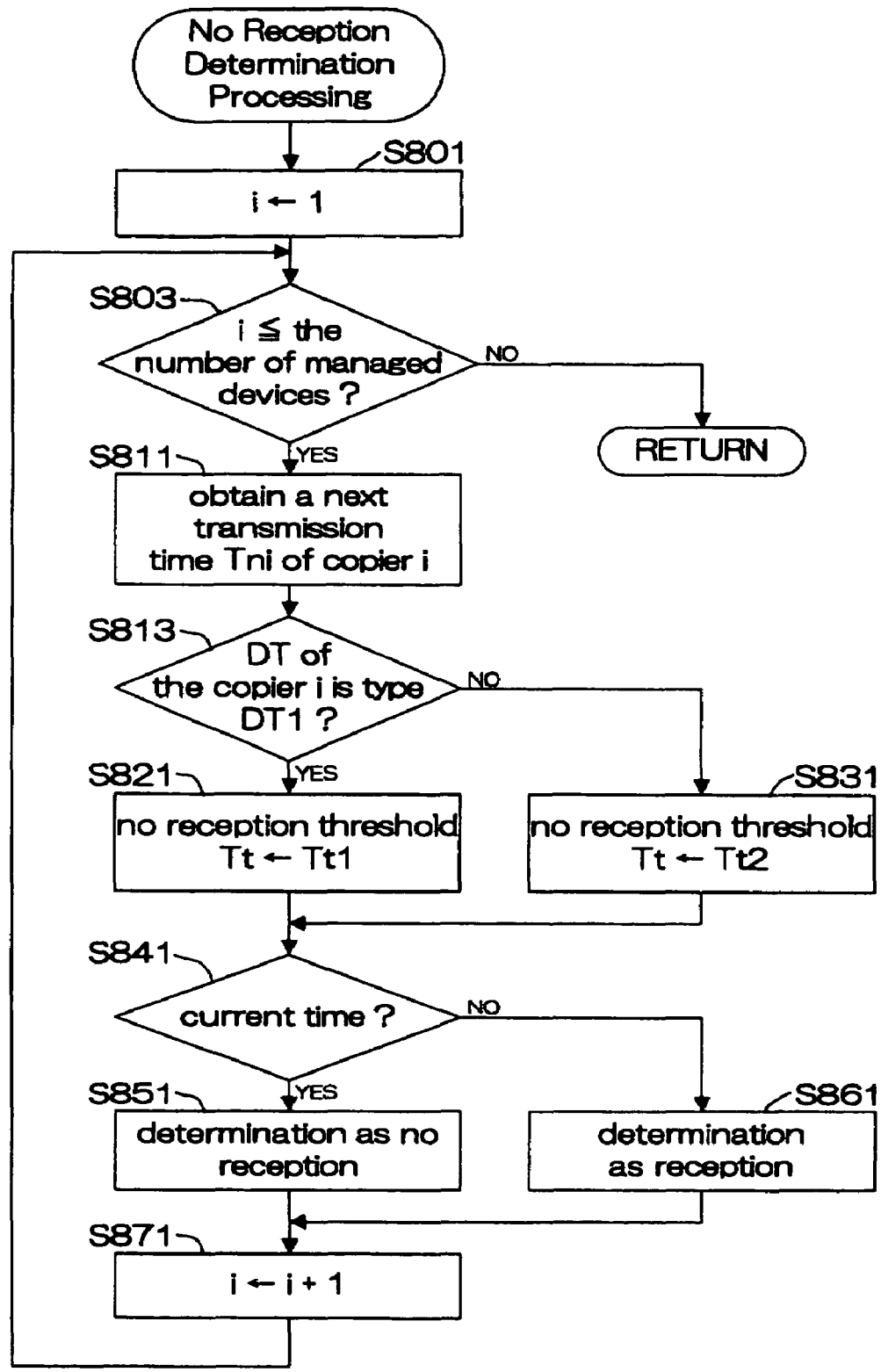
FIG. 18 is a flow chart of the no reception condition determination in the central management apparatus of the system of FIG. 1.

FIG. 17 shows the process of receiving data transmitted from a type DT2 copier management unit, and transmitting data to the copier management unit.

First, the presence of electronic mail for the central management unit is read by the mail server 83 on the central management unit side (step S701). When mail is present (step S703: YES), the mail is read from the mail server 83, item and monthly totals are calculated, and data for screen display are created by data selection (refer to step S 85 of FIG. 15) (step S711). When mail is not present (step S703: NO), the routine advances to step S721).

In step S721, the presence/absence of data to be transmitted to the type DT2 copier management unit are detected. Data to be transmitted to the copier management unit includes, for example, instruction for changing the set conditions of the copier (setting change instruction), instruction requesting copier operation (operation instruction), current time, next fixed-time transmission date and time, next closing transmission date and time and the like. When there are data to be transmitted to the copier management unit (step S721: YES), these data are transmitted as electronic mail (step S731). When there are no data to be transmitted, the mail send/receive process ends.

When the mail transmission fails, a process for re-transmitting the mail is executed (not illustrated).

(3-4-4) No Reception Determination

The central management unit determines whether or not data (data transmitted to the central management unit at the fixed time set for each copier) from a copier management unit managing the copier has arrived within the allowable time after the fixed time. When data have not arrived, it is determined that that copier is a [no reception copier]. These processes are described with reference to the flow chart of FIG. 18. A copier determined to be a [no reception copier] is regarded as a copier having some type of abnormal occurrence, e.g., inquiries by telephone may result in a service call.

First, an initial value [1] is set for the index i for the no reception determination relating to all copiers under management by the central management unit (step S801).

Then, a check is made to determine whether or not the index i is within the number of copiers under management by the central management unit (step S803). If the index i is within the number of copier sunder management (step S803: YES), the next fixed-time transmission date and time Tni of the copier i is obtained (step S811).

Then the type of copier management unit managing the copier i is determined (step S813). As a result, if the copier management unit is type DT1 (step S813: YES), Tt21 is set as the no reception threshold Tt (allowable time billing items) (step S821). If the copier management unit is type DT2 (step S813: NO), Tt2 is set as the no reception threshold Tt (step S831).

Type DT1 is a fairly high real time communication method since data are transmitted/received by direct connection between terminals using a public telephone line. In contrast, type DT2, which transmits electronic mail (packet data) over the internet, is a low real time communication method since the transmitted electronic mail is delivered to the receiver via a plurality of computers. In other words, mail arrival may be delayed due to impairment of the route. However, a slight delay is within the normal range of internet mail. In consideration of this fact, the allowable time for delay of the fixed-time transmission from the type DT1 copier management unit (no reception threshold Tt1) is set at a shorter time than the allowable time for delay of the fixed-time transmission from the type DT2 copier management unit (no reception threshold Tt2). That is, Tt1<tt2. Specifically, Tt1=1 hr, and Tt2=24 hr.

A determination is made as to whether or not the date and time of the determined Tt added to the next fixed-time transmission date and time Tni of the copier i exceeds the current date and time (step S841). As a result, when the current date and time is exceeded (step S841: YES), it is determined that the fixed-time transmission from copier i is a no reception condition (step S851). On the other hand, when the current date and time is not exceeded (step S841: NO), a no reception condition is not determined (step S861).

In step S871, the index i is incremented. Then, the process returns to step S803, and the previously described processes are repeated until determinations are made for all copiers under management of the central management unit.

Although a no reception condition is determined for each copier under management in the present embodiment, the no reception condition also may be determined for each copier management unit.

In the description above, a next fixed-time transmission time is set beforehand for each copier, and a check is made to determine whether or not a no reception condition exists for all copiers under management, i.e., a check is made to determine whether or not the [next fixed-time transmission time+the allowable time of a particular copier] exceeds the current time, but it is to be noted that the present invention is not limited to this arrangement. For example, a time table of [fixed time+allowable time of a particular copier] may be created beforehand for each copier, such that when that time arrives, the presence/absence of reception of data from that copier may be checked.

In the foregoing description, the allowable time (no reception threshold Tt) of each copier was set by checking the type of copier management unit managing the copier each time, but the allowable time itself may be stored in memory for each copier beforehand an need not be set by checking each time, and the [next fixed time+the allowable time of the specific copier] may be stored in memory beforehand for the corresponding copier.

The method of managing the type of copier management unit under management of the central management unit may use other than key input, for example, a copier management unit may be managed as a type DT2 when a previous electronic mail has been received, and managed as a type DT1 when data has previously been received by a telephone line connection.

(3-4-5) Setting the Fixed-time Transmission Date and Time

The method of setting the fixed-time transmission date and time is described below.

Assume, for example, wanting to receive data from all copiers under management on a specific day. The central management unit checks the types of the copier management units managing all the individual copiers under management, and allots a fixed-time transmission date and time in accordance with the type of copier management unit.

If the copier management unit is a type DT1, a fixed-time transmission date and time on the afternoon of the specified date is allotted.

For example, if communication of one fixed-time transmission requires 3 min on average, transmission date and time are allotted for each copier at 3 min intervals from 0:00 p.m.

On the other hand, if the copier management unit is a type DT2, fixed-time transmission date and time are allotted in the morning of the specified day. Since electronic mail does not require a severe time allotment, e.g., 100 copiers can be allotted to each 1 hour interval from 0:00 a.m.

According to the present invention, a suitable no reception determination can be made in accordance with each communication means even when a plurality of devices are managed via connection to device management units using different communication methods because different thresholds (allowable time) are used for no reception determination in accordance with the communication method of the device management unit connected to the device.

Furthermore, according to the present invention, there is a high possibility of receiving data without a no reception condition within a specific period even when a plurality of devices are managed by connection to device management units using different communication methods under one central management apparatus because device management units using a communication method having a short threshold are specified an early time as a data transmission time, compared to device management units using communication methods having a long threshold for determining a no reception condition.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A central management apparatus for managing devices connected to device management units by data communication with first and second device management units using different communication methods, the central management apparatus comprising:
   a memory for storing a first transmission time set for the first device management unit and a second transmission time set for the second device management unit;
   a first counting unit for counting elapsed time from the first transmission time when data have not been received from the first device management unit at the first transmission time;
   a second counting unit for counting the elapsed time from the second transmission time when data have not been received from the second device management unit at the second transmission time;
   a threshold setting unit for setting a first threshold value for the first device management unit and setting a second threshold value different from the first threshold value for the second device management unit; and
   a determining unit for determining a no reception condition when the elapsed time by the first counting unit exceeds the first threshold value or the elapsed time counted by the second counting unit exceeds the second threshold value.

2. The central management apparatus as claimed in claim 1, further comprising:
   a fixed-time transmission time setting unit for setting the next fixed-time transmission time for each device; and
   a transmission unit for transmitting the set fixed-time transmission time to the device management unit connected to each device.

3. The central management apparatus as claimed in claim 2, wherein the fixed-time transmission time setting unit sets the next fixed-time transmission time in accordance with a respective communication method of the connected device management unit.

4. The central management apparatus as claimed in claim 2, wherein the fixed-time transmission time setting unit allots an earlier time to devices having an allowable time set by the setting unit which is longer than devices having an allowable time which is shorter.

5. The central management apparatus as claimed in claim 1, wherein the communication method of the first device management unit is a method for transmitting data over a public telephone line, and the communication method of the second device management unit is a method for transmitting data by electronic mail over the internet.

6. The central management apparatus as claimed in claim 5, wherein the threshold setting unit sets the threshold value of the first device management unit so as to be shorter than the threshold value of the second device management unit.

7. The central management apparatus as claimed in claim 1, wherein the devices are image forming apparatuses.

8. A management system including a central management apparatus, a first device management unit for data communication with the central management apparatus using a first communication method, and a second device management unit for data communication with the central management apparatus using a second communication method, the first device management unit comprising:
   a first transmission unit for transmitting data relating to a connected device to the central management apparatus at a first fixed time,
   the second device management unit comprising:
   a second transmission unit for transmitting data relating to a connected device to the central management apparatus at a second fixed time, the central management apparatus comprising:
   a memory for storing a first transmission time set for the first device management unit and a second transmission time set for second device management unit;
   a first counting unit for counting elapsed time from the first transmission time when data have not been received from the first device management unit at the first transmission time;
   a second counting unit for counting elapsed time from the second transmission time when data have not been received from the second device management unit at the second transmission time;
   a threshold setting unit for setting a first threshold value for the first device management unit, and setting a second threshold value different from the first threshold value for the second device management unit; and
   a determining unit for determining a no reception condition when the elapsed time counted by the first counting unit exceeds the first threshold value or the elapsed time counted by the second counting unit exceeds the second threshold value.

9. The management system as claimed in claim 8, wherein the first communication method is a method for transmitting data over a public telephone line, and the second communication method is a method for transmitting data by electronic mail over the internet.

10. A management system as claimed in claim 9, wherein the threshold setting unit sets the threshold value of the first device management unit to be shorter than the threshold value of the second device management unit.

11. The management system as claimed in claim 8, wherein the devices are image forming apparatuses.

* * * * *